(12) United States Patent
Nakagome et al.

(10) Patent No.: US 10,997,979 B2
(45) Date of Patent: May 4, 2021

(54) VOICE RECOGNITION DEVICE AND VOICE RECOGNITION METHOD

(71) Applicant: CASIO COMPUTER CO., LTD., Tokyo (JP)

(72) Inventors: Kouichi Nakagome, Tokorozawa (JP); Keisuke Shimada, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 172 days.

(21) Appl. No.: 16/441,348

(22) Filed: Jun. 14, 2019

(65) Prior Publication Data

US 2019/0392840 A1   Dec. 26, 2019

(30) Foreign Application Priority Data

Jun. 21, 2018   (JP) ............................. JP2018-118159
Jun. 6, 2019   (JP) ............................. JP2019-105860

(51) Int. Cl.
*G10L 25/00* (2013.01)
*G10L 15/00* (2013.01)
*G10L 17/00* (2013.01)
*G06K 9/00* (2006.01)
*G10L 15/22* (2006.01)

(52) U.S. Cl.
CPC .......... *G10L 17/00* (2013.01); *G06K 9/00315* (2013.01); *G10L 15/22* (2013.01); *G10L 2015/227* (2013.01)

(58) Field of Classification Search
CPC ............................... G10L 17/00; G10L 15/22
See application file for complete search history.

(56) References Cited

U.S. PATENT DOCUMENTS

| | | | | | |
|---|---|---|---|---|---|
| 5,884,257 | A | * | 3/1999 | Maekawa | G10L 25/87 704/248 |
| 2005/0102134 | A1 | * | 5/2005 | Manabe | G10L 15/25 704/207 |

FOREIGN PATENT DOCUMENTS

JP            06301393 A      10/1994

* cited by examiner

*Primary Examiner* — Ibrahim Siddo
(74) *Attorney, Agent, or Firm* — Holtz, Holtz & Volek PC

(57) ABSTRACT

A voice recognition device provided with a processor configured to determine a breathing period immediately before uttering which is a period in which a lip of a target person has moved with breathing immediately before uttering based on a captured image of the lip of the target person, to detect a voice period which is a period in which the target person is uttering without including the breathing period immediately before uttering determined above based on the captured image of the lip of the target person captured, to acquire a voice of the target person, and to recognize the voice of the target person based on the voice of the target person acquired above within the voice period detected above.

10 Claims, 7 Drawing Sheets

VOICE RECOGNITION DEVICE AND VOICE RECOGNITION METHOD

CROSS-REFERENCE TO RELATED APPLICATION

This application claims priority on Japanese Patent Application Nos. 2018-118159 filed Jun. 21, 2018 and 2019-105860 filed Jun. 6, 2019, the entire contents of which are incorporated by reference.

BACKGROUND

1. Field

The present invention relates to a voice recognition device and a voice recognition method.

2. Related Art

Conventionally, as a voice recognition device detecting a voice period (voice section) which is a period in which a target person is uttering based on movement information of lips of the target person in order to recognize a voice of the uttering target person (hereinafter referred to as "target person") while suppressing influence of a noise, a device described in Japanese Patent Application Publication No. 6-301393 is known, for example. According to the conventional voice recognition device, the movement information of the lips is wavelet transformed, and then the voice period is detected from the wavelet transformed information thus obtained. Alternatively, the voice period is detected using a neural network from the movement information of the lips.

SUMMARY

A voice recognition device provided with a processor configured to determine a breathing period immediately before uttering which is a period in which a lip of a target person has moved with breathing immediately before uttering based on a captured image of the lip of the target person, to detect a voice period which is a period in which the target person is uttering without including the breathing period immediately before uttering determined above based on the captured image of the lip of the target person captured, to acquire a voice of the target person, and to recognize the voice of the target person based on the voice of the target person acquired above within the voice period detected above.

DETAILED DESCRIPTION

Figure 1:
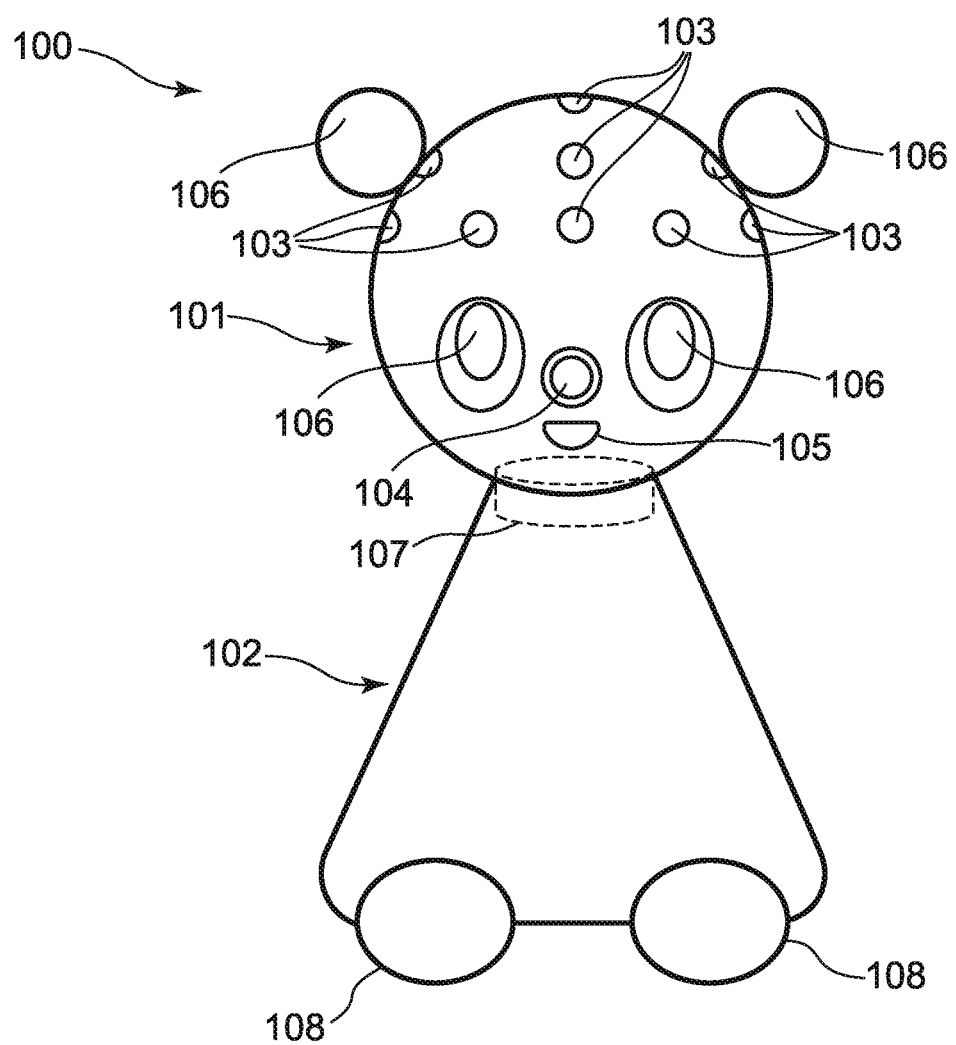
FIG. 1 is an appearance view of a robot according to an embodiment of the present invention.

Hereinafter, an aspect for implementing the present invention is described in detail with reference to the drawings. FIG. 1 is a figure schematically illustrating the appearance when a robot 100 having a voice period detection device and a voice recognition device according to an embodiment is viewed from the front. The robot 100 is a humanoid communication robot having a head portion 101 and a body 102. The robot 100 is placed in a house, for example. When the robot 100 is spoken to by a dweller or the like who is a predetermined target (hereinafter, referred to as "target person"), the robot 100 interacts with the target person having spoken to the robot 100.

As illustrated in FIG. 1, the head portion 101 of the robot 100 is provided with a camera 104, a microphone array 103, an audio speaker 105, a sensor group 106, a neck joint drive portion 107, and an undercarriage drive portion 108.

The camera 104 is provided on the lower side of the front surface of the head portion 101, i.e., a location of what is called "nose" of a human face. The camera 104 continuously captures an image at a predetermined frame rate (for example, 30 fps (frame/second)) under the control of a control portion 201 described later. The frame rate is set beforehand by an experiment or the like to such a value that the opening/closing determination of the lips by a mouth opening/closing determination portion 308 described later can be appropriately performed (Step 504 of FIG. 5).

The microphone array 103 contains 13 microphones, for example. Eight microphones of the 13 microphones are arranged at locations at the height of what is called "forehead" of the human face at regular intervals around the periphery of the head portion 101. On the upper side relative to the 8 microphones, 4 microphones are arranged at regular intervals around the periphery of the head portion 101. Further, one microphone is arranged at a top portion of the head portion 101. The microphone array 103 detects sounds generated around the robot 100.

The speaker 105 is provided on the lower side relative to the camera 104, at a location of what is called "mouth" of the human face. The speaker 105 converts a control signal from the control portion 201 to a voice, and then outputs various voices under the control of the control portion 201.

The sensor group 106 is provided at locations of what are called "eyes" and "ears" of the human face. The sensor group 106 includes an acceleration sensor, an obstacle detection sensor, and the like and is used to control the posture of the robot 100 or to secure the safety thereof.

The neck joint drive portion 107 is a member connecting the head portion 101 and the body 102. The head portion 101 is connected to the body 102 through the neck joint drive portion 107 indicated by the dashed line. The neck joint drive portion 107 includes a plurality of motors. When the control portion 201 drives the plurality of motors, the head portion 101 of the robot 100 rotates. The neck joint drive portion 107 has functions of rotating the head portion 101 of the robot 100 and acquiring the rotation amount thereof.

The undercarriage drive portion 108 has a function of moving the robot 100. Although not particularly illustrated, the undercarriage drive portion 108 includes four wheels provided on the lower side of the body 102. Two wheels of the four wheels are arranged on the front side of the body 102 and the remaining two wheels are arranged on the back side of the body 102. As the wheels, for example, omni wheels or mecanum wheels are used. The control portion 201 causes the wheels of the undercarriage drive portion 108 to rotate to thereby move the robot 100.

Figure 2:
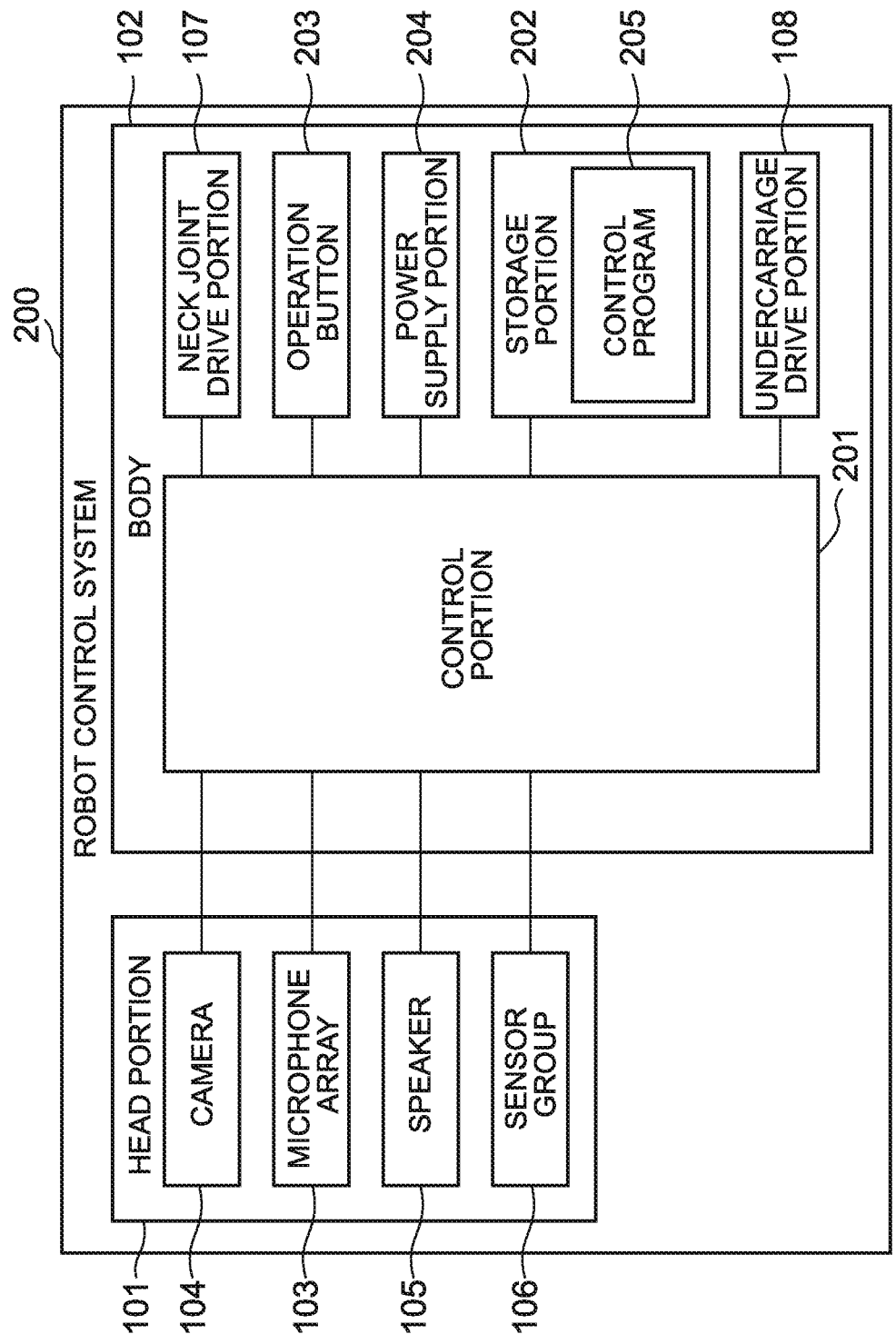
FIG. 2 is a block diagram illustrating the configuration of the robot.

FIG. 2 is a block diagram illustrating a robot control system 200 which is a control system of the robot 100 having the appearance illustrated in FIG. 1. In FIG. 2, portions designated by the same reference numbers as those of FIG. 1 are the same as the portions of FIG. 1. In FIG. 2, the control portion 201 placed in the body 102 contains a central processing unit (CPU), a random access memory (RAM), and the like. The control portion 201 is electrically connected to each of the microphone array 103, the camera 104, the speaker 105, and the sensor group 106 in the head portion 101 and to each of the neck joint drive portion 107 and the undercarriage drive portion 108 in the body 102 and controls the respective portions by reading and executing a control program 205 stored in a storage portion 202 described later with the RAM as a work area.

The storage portion 202 includes a solid state disk drive, a hard disk drive, a flash memory, and the like and is provided in the body 102. The storage portion 202 stores the control program 205 executed by the control portion 201 and various data including voice data collected by the microphone array 103, image data captured by the camera 104, and the like. The control program 205 stored in the storage portion 202 includes a sound source separation information detection program, a movement program, an interaction program, and the like described later.

Operation buttons 203 are provided on the back of the body 102 (not illustrated in FIG. 1). The operation buttons 203 are various kinds of buttons for operating the robot 100 and include a power button, a volume control button for the speaker 105, and the like.

A power supply portion 204 is a rechargeable battery built in the body 102 and supplies power to the respective portions of the robot control system 200.

Figure 3:
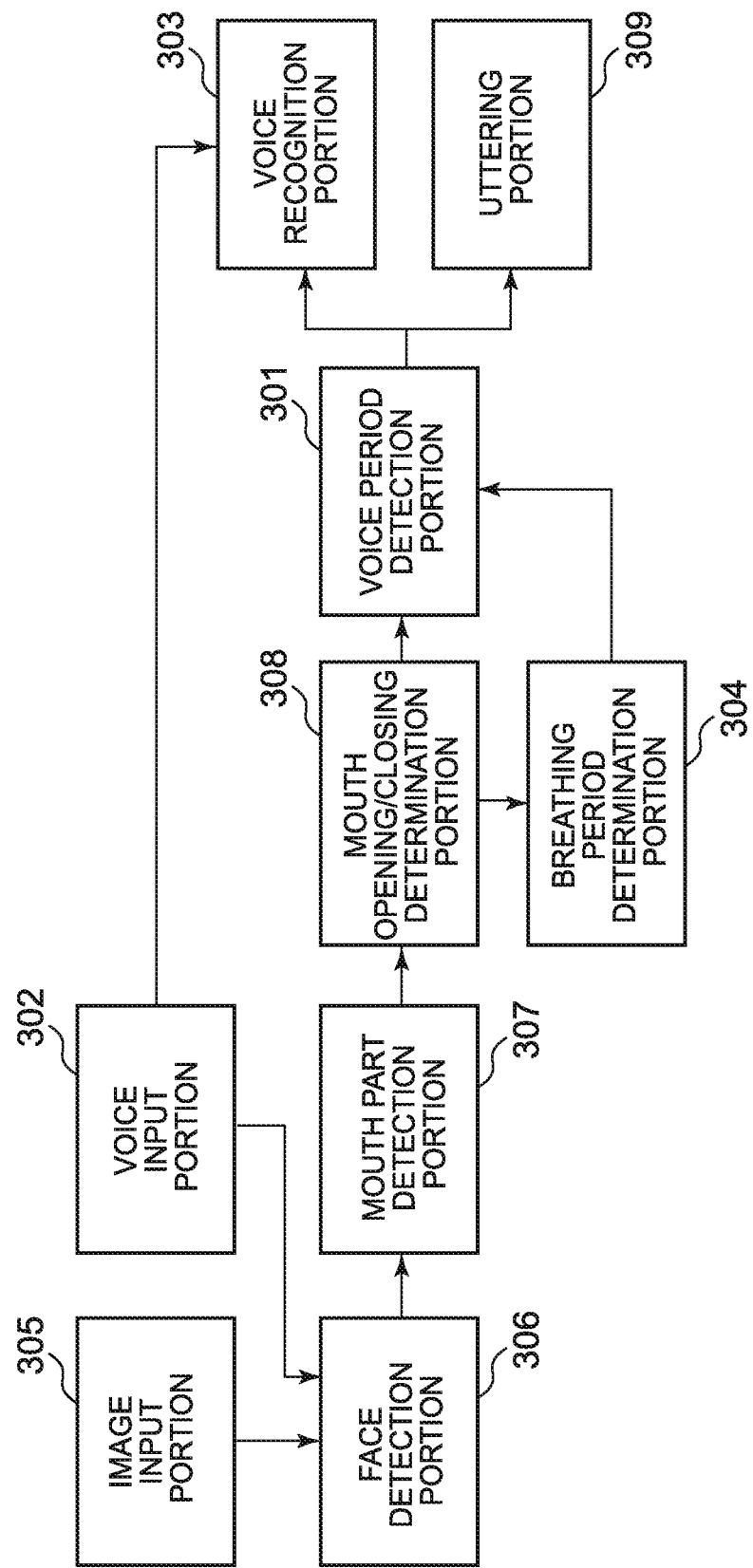
FIG. 3 is a block diagram illustrating the configuration of an interaction function of the robot.

FIG. 3 is a block diagram illustrating the configuration of an interaction function implemented as part of the function in which the control portion 201 of FIG. 2 executes the control program 205 in the storage portion 202. The configuration of the interaction function includes a voice period detection portion 301, a voice input portion 302, a voice recognition portion 303, a breathing period determination portion 304, an image input portion 305, a face detection portion 306, a mouth part detection portion 307, the mouth opening/closing determination portion 308, and an uttering portion 309. The respective function portions illustrated in FIG. 3 may be achieved by hardware, such as a Field Programmable Array (FPGA), in the control portion 201.

In FIG. 3, the voice input portion 302 inputs a voice from each microphone configuring the microphone array 103 of FIG. 1 and stores the input voice in the RAM as appropriate for voice recognition described later by the voice recognition portion 303.

The image input portion 305, the face detection portion 306, and the mouth part detection portion 307 described above obtain an image of lips of the target person at timing when the voice input portion 302 acquires a voice. Specifically, the image input portion 305 inputs images consecutively captured at the above-described predetermined frame rate from the camera 104 of FIG. 1. Next, the face detection portion 306 performs face detection processing of detecting a face region of the target person from the input images. Then, the mouth part detection portion 307 performs mouth part detection processing of detecting a mouth part from the detected face region of the target person to obtain a captured image of the lips of the target person (hereinafter referred to as "lip image").

The mouth opening/closing determination portion 308 performs mouth opening/closing determination processing of determining a state where an opening/closing movement (movement in which the lips are opened/closed) of the lips of the target person is performed or a state where the opening/closing movement of the lips of the target person is not performed based on the lip image of the target person output by the mouth part detection portion 307.

The breathing period determination portion 304 performs breathing period determination processing of determining a breathing period immediately before uttering which is a period in which the lips of the target person have moved with breathing immediately before the uttering based on the determination result of the mouth opening/closing determination portion 308 based on the lip image of the target person output by the mouth part detection portion 307.

The voice period detection portion 301 performs voice period detection processing of detecting a voice period of the target person which is a period in which the target person is uttering based on the determination result of the mouth opening/closing determination portion 308 based on the lip image of the target person output by the mouth part detection portion 307. At this time, the voice period detection portion 301 detects the voice period of the target person without including the breathing period immediately before uttering determined by the breathing period determination portion 304 in the voice period of the target person. This is because of the following reasons. More specifically, this is because there is a possibility that some target persons move the lips in order to take a breath immediately before uttering in some cases and, in the breathing period immediately before uttering with breathing immediately before uttering, the target person merely takes a breath and does not actually utter (voice of the target person is not generated), and therefore, when such a breathing period immediately before uttering is included in the voice period, a noise generated during the breathing period immediately before uttering is included in a voice recognized by the voice recognition portion 303.

The voice period detection portion 301 detects timing before a predetermined period of time (which is defined as "ERT") from timing when the opening/closing movement of the lips of the target person has ended as end timing of the voice period based on the determination result of the mouth opening/closing determination portion 308. This is because of the following reasons. More specifically, this is because there is a possibility that the timing when the uttering of the target person actually ends tends to be timing a little earlier than the timing when the opening/closing movement of the lips of the target person ends, and therefore, when the timing when the opening/closing movement of the lips ends is detected as the end timing of the voice period, a noise generated during a period until the opening/closing movement of the lips ends after the uttering actually ends is included in a voice recognized by the voice recognition portion 303.

The voice recognition portion 303 performs voice recognition processing of recognizing a voice of the target person using a known voice recognition technique based on a voice of the target person acquired and stored by the voice input portion 302 within the voice period detected by the voice period detection portion 301.

The uttering portion 309 performs uttering processing by voice synthesis using a known voice synthesis technique in accordance with an interaction algorithm according to the voice recognition result obtained by the voice recognition portion 303. The voice synthesized by the uttering processing is uttered to the target person through the speaker 105 of FIG. 1 and FIG. 2, so that the interaction between the target person and the robot 100 of FIG. 1 is performed.

The voice recognition portion 303 may perform sound source arrival direction estimation processing, sound source separation processing, sound volume calculation processing, S/N ratio calculation processing, and the like, for example.

The voice recognition portion 303 may estimate, with the voice input by the voice input portion 302 when the voice period detection portion 301 detects the voice period as a signal voice, the arrival direction of the signal voice based on the lip image output by the mouth part detection portion 307 and the signal voice power of the signal voice in the sound source arrival direction estimation processing.

On the other hand, the voice recognition portion 303 may estimate, with a sound input by the voice input portion 302 when the voice period detection portion 301 does not detect the voice period as a noise, the arrival direction of the noise based on the noise power of the noise in the sound source arrival direction estimation processing. At this time, the sound source localization (position of the noise source) of a noise from sound sources other than the target person may be estimated by performing processing based on a Multiple Signal Classification (MUSIC) method which is one of sound source localization approaches in the sound source arrival direction estimation processing.

The voice recognition portion 303 may perform arithmetic processing based on a beam forming technique described in the following Document 1, for example, to thereby perform sound source separation processing in which the signal voice uttered by the target person is emphasized or the noise other than the signal voice is suppressed with the arrival direction of the signal voice or the arrival direction of the noise currently obtained by the sound source arrival direction estimation processing as an input.

<Document 1>

Futoshi Asano, "Sound source separation," [online], received on November 2011, "Chishiki-no-mori (Forest of Knowledge)" issued by The Institute of Electronics, Information and Communication Engineers (IEICE), [searched on Jun. 15, 2017], Internet URL:http://www.ieice-hbkb.org/files/02/02gun_06hen_02.pdf Specifically, when the mouth opening/closing determination portion 308 determines the state where the opening/closing movement of the lips of the target person is performed, the voice recognition portion 303 may perform beam steering arithmetic processing of beam-steering (emphasizing) the signal voice in the signal voice arrival direction currently obtained by the sound source arrival direction estimation processing by arithmetic processing of the above-described beam forming to thereby obtain the emphasized signal voice in the sound source separation processing.

On the other hand, when the mouth opening/closing determination portion 308 determines the state where the opening/closing movement of the lips is not performed, the voice recognition portion 303 may perform null steering arithmetic processing of null-steering (suppressing) the noise in the noise arrival direction currently obtained by the sound source arrival direction estimation processing by the arithmetic processing of the above-described beam forming to thereby obtain the suppressed noise in the sound source separation processing.

The voice recognition portion 303 calculates the sound volume of each of the beam-steered (emphasized) signal voice or the null-steered (suppressed) noise obtained by the sound source separation processing in the sound volume calculation processing.

The voice recognition portion 303 calculates a signal-to-noise ratio (hereinafter, referred to as "S/N ratio") based on the sound volume of the signal voice and the sound volume of the noise calculated by the sound volume calculation processing in the S/N ratio calculation processing, and then determines whether the S/N ratio is larger than a threshold.

When the S/N ratio is equal to or lower than the threshold as a result of the determination in the S/N ratio calculation processing, the voice recognition portion 303 determines that the S/N ratio sufficient for voice recognition is not obtained. In this case, the control portion 201 of FIG. 2 controls the undercarriage drive portion 108 of FIG. 1 or 2, for example, to thereby move the robot 100 while maintaining a certain relationship (for example, a certain distance, a certain angle, or the like) with the target person.

After moving the robot 100, the voice recognition portion 303 performs the determination operation of the S/N ratio similarly to the above again. When the S/N ratio is larger than the threshold as a result, the voice recognition portion 303 determines that the S/N ratio sufficient for the voice recognition is obtained and that the positional relationship of the robot 100 relative to the target person has come to the sound source separation position which is an optimized position where the signal voice can be most successfully separated from the noise (or determines that the directional relationship of the robot 100 relative to the target person has become the sound source separation direction which is the optimized direction in which the signal voice can be most successfully separated from the noise). In this case, the voice recognition portion 303 understands the contents of the uttering of the target person by performing the voice recognition processing to the beam-steered (emphasized) signal voice obtained by the sound source separation processing.

Figure 4:
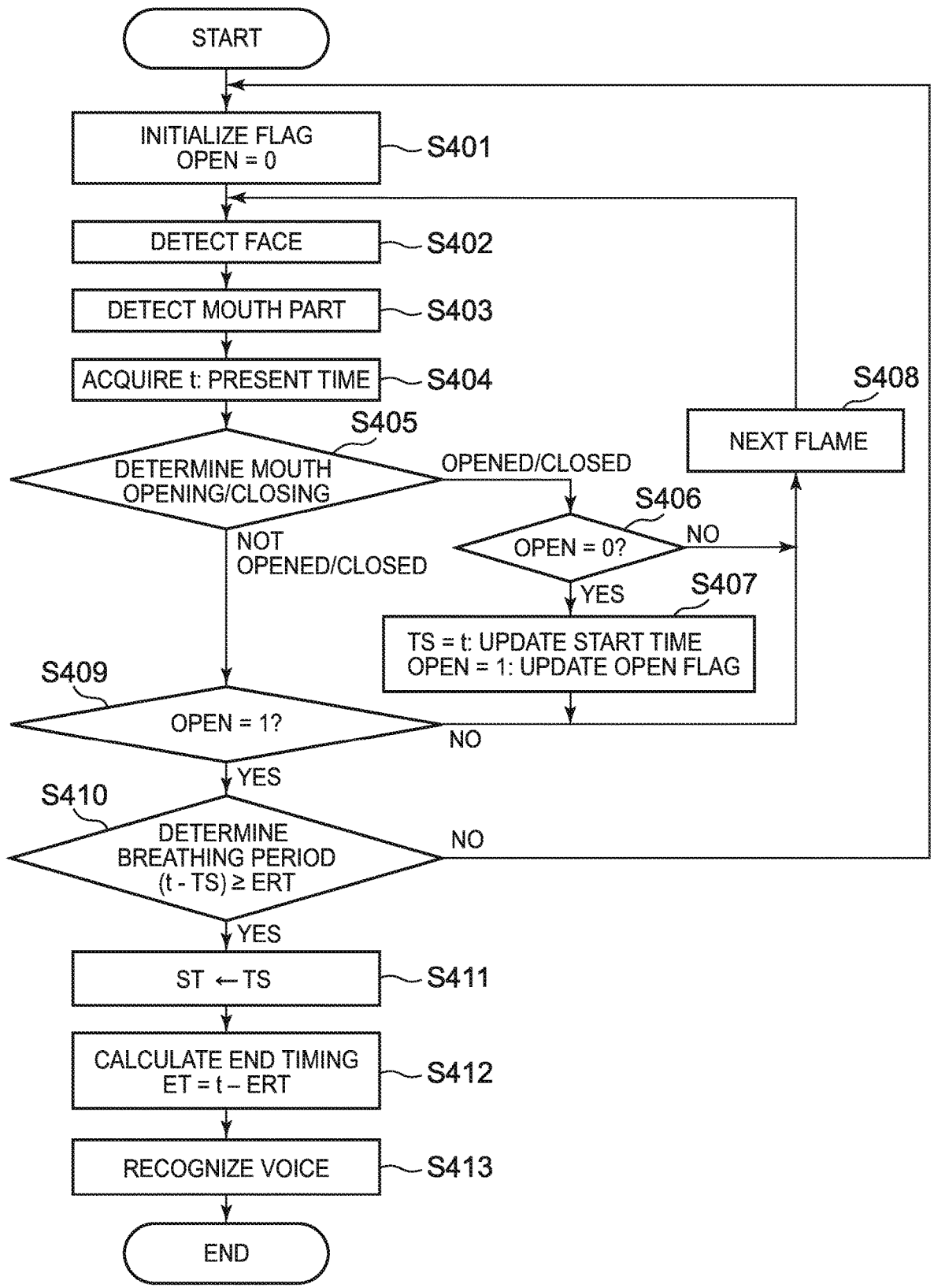
FIG. 4 is a flow chart illustrating an example of processing for performing voice period detection processing and voice recognition processing in the interaction function of the robot.

FIG. 4 is a flow chart illustrating an example of processing for performing the voice period detection processing and the voice recognition processing in the interaction function illustrated by the block diagram of FIG. 3. The processing example of the flow chart is implemented as processing performed by hardware of the control portion 201 achieving the configuration of the block diagram of FIG. 3 or processing of the control program 205 executed by the control portion 201 of FIG. 2.

First, the control portion 201 initializes a value of an "open flag" contained as a variable in the RAM thereinside which is not particularly illustrated to 0 (Step S401). In FIG. 4, a state where the value of the open flag is 0 is expressed as "Open=0".

Next, the face detection portion 306 of FIG. 3 performs face detection processing (Step S402). In the face detection processing, a face region is detected from an image input through the image input portion 305 from the camera 104. For the face detection processing, a known face detection technique is usable. For example, any one of the face detection techniques described in the following Document 2 may be applied.

<Document 2>

Kazuhiro Hotta, "Special Issue: Face Recognition Technique 1. Research Tendency of Face Recognition" [online], published on Mar. 28, 2012, The journal of The Institute of Image Information and Television Engineers, Vol. 64, No. 4(2010), pp. 459 to 462, [Searched on Jun. 15, 2017], Internet <URL: https://www.jstage.jst.go.jp/article/itej/64/4/64_4_455/_pd f>

Next, the mouth part detection portion 307 of FIG. 3 performs mouth part detection processing (Step S403) using an image of the face region detected in the face detection processing. For the mouth part detection processing, a known face part detection technique is usable. For example, any one of the face part detection techniques described in the following Document 3 may be adopted.

<Document 3> littlewing, "Summary of face recognition techniques available in Web camera—2," [online], published on Apr. 7, 2015, [searched on Jun. 15, 2017], Internet <URL: http://littlewing.hatenablog.com/entry/2015/04/07/221856>

By the mouth part detection processing in Step S403, face part detection results which are labelled coordinate values are first obtained, for example. As a format example of the labelled face part detection results, an example described as FIG. 2 in the following Document 4 can be adopted as illustrated as 601 of FIG. 6, for example.

<Document 4>

C. sagonas, "Facial point annotations," [online], [searched on Jun. 15, 2017], Internet <URL: https://ibug.doc.ic.ac.uk/resources/facial-point-annotations/>

Figure 6:
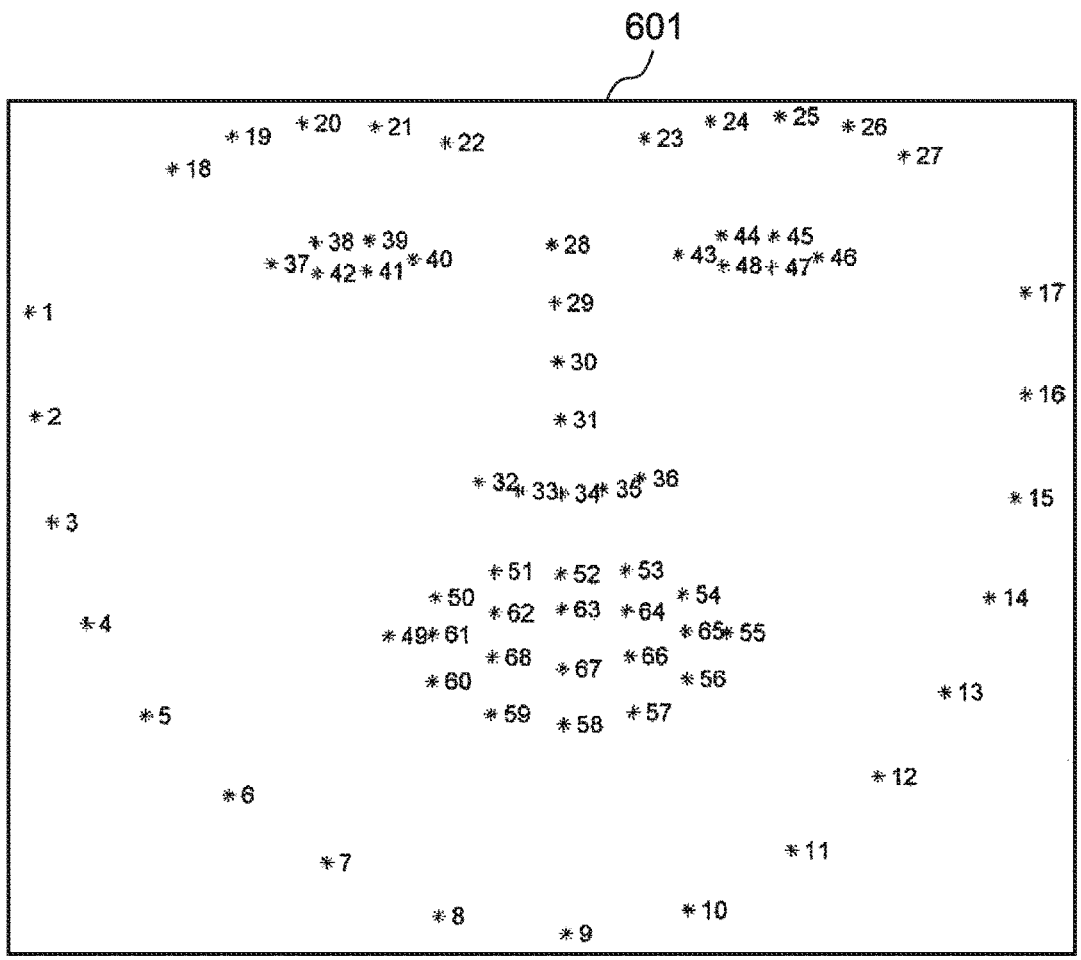
FIG. 6 is a figure illustrating an example of a format of labeled face part detection results.

In the mouth part detection processing in Step S403, labels 49 to 68 are detected as a mouth part and labels 28 to 36 are detected as a nose part, for example, out of the face part detection results illustrated as 601 in FIG. 6.

Next, the control portion 201 acquires the present time t by referring to a timer which is not particularly illustrated (Step S404).

Thereafter, the mouth opening/closing determination portion 308 of FIG. 3 performs mouth opening/closing determination processing of determining a state where an opening/closing movement of the lips of the target person is performed or a state where the opening/closing movement of the lips of the target person is not performed using the labelled coordinate values (for example, labels 49 to 68 and labels 28 to 36 of 601 of FIG. 6) of the mouth part and the nose part calculated in Step S403 (Step S405).

Figure 5:
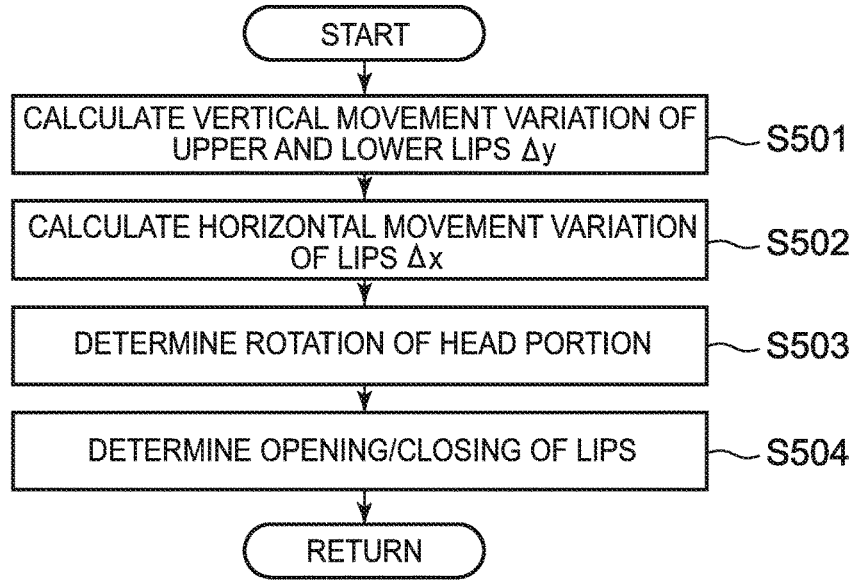
FIG. 5 is a flow chart illustrating an example of mouth opening/closing determination processing.

FIG. 5 is a flow chart illustrating a detailed example of the mouth opening/closing determination processing in Step S405 of FIG. 4.

First, the mouth opening/closing determination portion 308 of FIG. 3 calculates the variation of the relative movement of an upper lip and a lower lip of the lips in the ordinate (vertical direction of the face) of the lips (hereinafter referred to as "vertical movement variation of upper and lower lips") $\Delta y$ (Step S501 of FIG. 5). At the present moment, a y coordinate amount difference sum y(t) is calculated in a frame F(t) at a certain time by an arithmetic operation of the following expression (1).

$$y(t)=yy1+yy2 \quad (1)$$

In Expression (1), yy1 represents the y coordinate amount difference sum between the lower line of the upper lip and the upper line of the lower lip and is calculated by an accumulation operation of the following expressions (2) to (7) according to the relationship in 601 of FIG. 6. In these expressions, an operator "+=" represents an arithmetic operation in which a right-side value is accumulated on a left-side value. The function "fabs( )" is a function in which the absolute value of the numerical value in the brackets is calculated using a floating point number. For example, "data. y[61](t)" indicates a y-coordinate data value of the label 61 of FIG. 6 in the frame image F(t) at time t. The same applies to the others.

$$yy1+=\text{fabs}(\text{data}.y[61](t)-\text{data}.y[67](t)) \quad (2)$$

$$yy1+=\text{fabs}(\text{data}.y[61](t)-\text{data}.y[58](t)) \quad (3)$$

$$yy1+=\text{fabs}(\text{data}.y[62](t)-\text{data}.y[66](t)) \quad (4)$$

$$yy1+=\text{fabs}(\text{data}.y[62](t)-\text{data}.y[57](t)) \quad (5)$$

$$yy1+=\text{fabs}(\text{data}.y[63](t)-\text{data}.y[65](t)) \quad (6)$$

$$yy1+=\text{fabs}(\text{data}.y[63](t)-\text{data}.y[56](t)) \quad (7)$$

In Expression (1), yy2 represents the y coordinate amount difference sum between an under-nose portion and the lower lip (upper side) and is calculated by the arithmetic operation of the following expressions (8) to (12) according to the relationship in 601 of FIG. 6.

$$yy2+=\text{fabs}(\text{data}.y[31](t)-\text{data}.y[60](t)) \quad (8)$$

$$yy2+=\text{fabs}(\text{data}.y[32](t)-\text{data}.y[61](t)) \quad (9)$$

$$yy2+=\text{fabs}(\text{data}.y[33](t)-\text{data}.y[62](t)) \quad (10)$$

$$yy2+=\text{fabs}(\text{data}.y[34](t)-\text{data}.y[63](t)) \quad (11)$$

$$yy2+=\text{fabs}(\text{data}.y[34](t)-\text{data}.y[64](t)) \quad (12)$$

The mouth opening/closing determination portion 308 next determines, as the vertical movement variation of upper and lower lips $\Delta y$, a difference absolute value between the y coordinate amount difference sum y(t) calculated by the arithmetic operation of Expression (1) for the frame image F(t) at time t and the y coordinate amount difference sum y(t−1) calculated by the same arithmetic operation as Expression (1) for a frame image F(t−1) at time (t−1) which is one frame earlier than the time t according to the following expression (13). Herein, the function "abs( )" is a function in which the absolute value for the numerical value in the brackets is calculated using an integer.

$$\Delta y=\text{abs}(y(t)-y(t-1)) \quad (13)$$

The value $\Delta y$ calculated by Expression (13) represents the variation of the relative movement of the upper lip and the lower lip in the vertical direction of the face and increases when the upper lip and the lower lip move in a direction away from or approaching each other.

Next, the mouth opening/closing determination portion 308 also calculates the variation of the movement in the abscissa (right and left direction of the face) of the lips (hereinafter referred to as "horizontal movement variation of lips") $\Delta x$ in the same arithmetic operation as that in the vertical movement variation of upper and lower lips $\Delta y$ described above (Step S502 of FIG. 5).

More specifically, an x coordinate amount difference sum x(t) is calculated by the arithmetic operation of the following expression (14) in the frame F(t) at a certain time. In Expression (14), "data. x[61](t)" represents an x coordinate data value of the label 61 of FIG. 6 in the frame image F(t) at time t, for example. The same applies to the others.

$$x(t)=\text{data}.x[61](t)+\text{data}.x[62](t)+\text{data}.x[63](t)+\text{data}.x[67](t)+\text{data}.x[66](t)+\text{data}.x[65](t) \quad (14)$$

Next, a difference absolute value between the x coordinate amount difference sum x(t) calculated by the arithmetic operation of Expression (14) for the frame image F(t) at the time t and an x coordinate amount difference sum x(t−1)

calculated by the same arithmetic operation as that of Expression (14) for the frame image F(t−1) at time (t−1) which is one frame earlier than the time t is calculated as the horizontal movement variation of lips Δx by the following expression (15).

$$\Delta x = \text{abs}(x(t) - x(t-1)) \quad (15)$$

The horizontal movement variation of lips Δx calculated by Expression (15) indicates the variation of the movement of the lips (the entire upper lip and lower lip) in the right and left direction of the face and increases when the lips are moving either to the right or the left.

Subsequently, the mouth opening/closing determination portion 308 performs rotation determination of the head portion 101 of FIG. 1 (Step 503 of FIG. 5). The mouth opening/closing determination portion 308 calculates a roll angle difference value Δroll, a yaw angle difference value Δyaw, and a pitch angle difference value Δpitch each indicating the variation of the posture of the head portion 101 between the frame image F(t) at the frame time t and the frame image F (t−1) at the frame time (t−1) one frame earlier than the frame at the frame time t from the following expression (16), expression (17), and expression (18), respectively, based on signals input into the mouth opening/closing determination portion 308 from the neck joint drive portion 107 of FIG. 1 or FIG. 2.

$$\Delta \text{roll} = \text{abs}(F(t)\text{roll} - F(t-1)\text{roll}) \quad (16)$$

$$\Delta \text{yaw} = \text{abs}(F(t)\text{yaw} - F(t-1)\text{yaw}) \quad (17)$$

$$\Delta \text{pitch} = \text{abs}(F(t)\text{pitch} - F(t-1)\text{pitch}) \quad (18)$$

Figure 7:
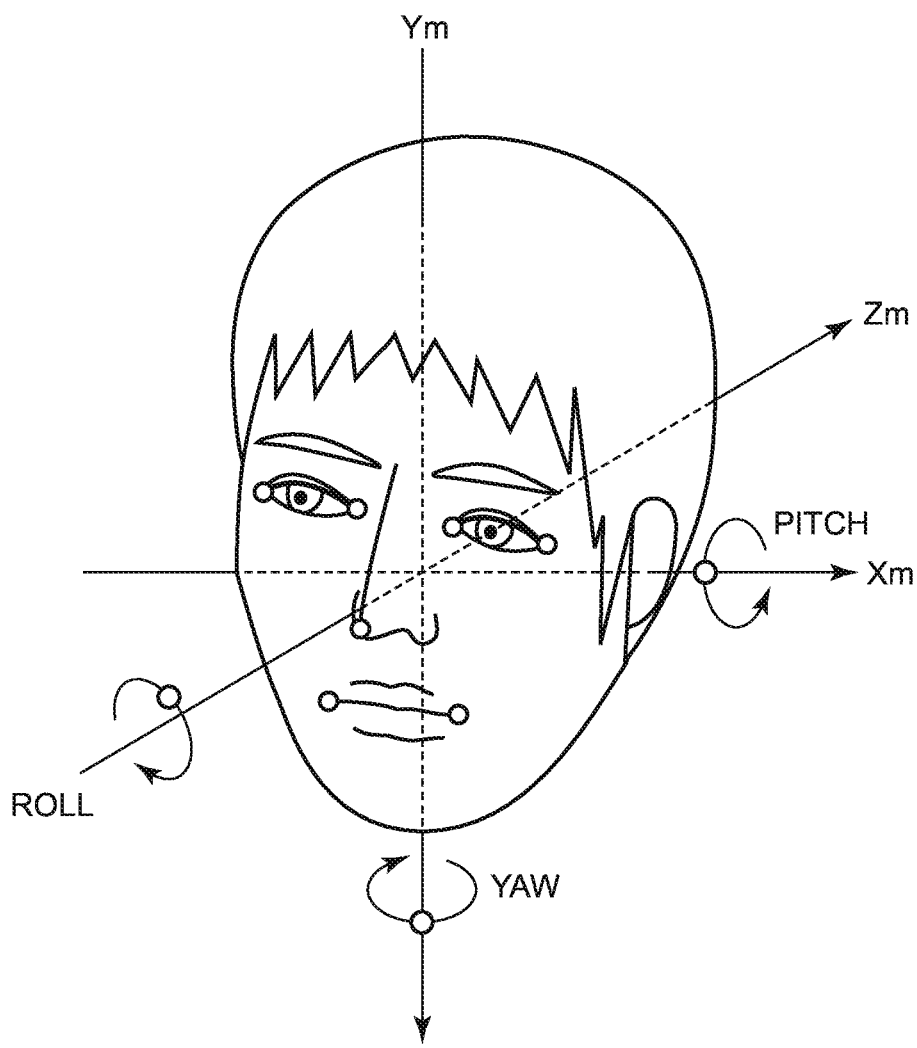
FIG. 7 is a figure schematically indicating the degree of freedom of the rotation of a head portion.

Herein, for example, the F(t)roll is a roll angle value input from the neck joint drive portion 107 into the mouth opening/closing determination portion 308 corresponding to the frame image F(t) at the time t and the F(t−1)roll is a roll angle value input from the neck joint drive portion 107 into the mouth opening/closing determination portion 308 corresponding to the frame image F(t−1) at the time (t−1). The same applies to each of the yaw angle values F(t)yaw and F(t−1)yaw and the pitch angle values F(t)pitch and F(t−1)pitch. FIG. 7 is a figure schematically illustrating the degree of freedom of the rotation of the head portion 101 of the robot 100 of FIG. 1. The neck joint drive portion 107 of FIG. 1 or 2 enables the rotation of the head portion 101 of the robot 100 around a pitch axis Xm, around a roll axis Zm, and around a yaw axis Ym relative to the body 102. The neck joint drive portion 107 outputs each of a pitch angle value around the pitch axis Xm, a roll angle value around the roll axis Zm, and a yaw angle value around the yaw axis Ym into the control portion 201 as described above.

The mouth opening/closing determination portion 308 calculates a roll angle difference value Δroll, a yaw angle difference value Δyaw, and a pitch angle difference value Δpitch as the variation of the rotation angle of the head portion 101 in the roll axis Zm, the yaw axis Ym, and the pitch axis Xm, respectively, as results of the arithmetic operations of Expressions (16), (17), and (18) above.

As methods for estimating the rotation angle of the head portion 101, various approaches are known and a technique other than the above may be adopted.

The mouth opening/closing determination portion 308 performs the opening/closing determination of the lips according to the rules described below based on the vertical movement variation of upper and lower lips Δy calculated in Step S501, the horizontal movement variation of lips Δx calculated in Step S502, and the roll angle difference value Δroll, the yaw angle difference value Δyaw, and the pitch angle difference value Δpitch as the variation of the rotation angle of the head portion 101 of the robot 100 calculated in Step S503 (Step S504 of FIG. 5). More specifically, the control portion 201 determines the state where the opening/closing movement of the lips is performed when the condition represented by the logical expression in the following expression (19) is satisfied and determines the state where the opening/closing movement of the lips is not performed (stop state) when the condition is not satisfied. In Expression (19), a first threshold y_th, a second threshold x_th, and a third threshold group of roll_th, yaw_th, and pitch_th are determination thresholds of Δy, Δx, Δroll, Δyaw, and Δpitch, respectively.

$$\Delta y > y\_th \,\&\&$$

$$\Delta x < x\_th \,\&\&$$

$$\Delta \text{roll} < \text{roll\_th} \,\&\&$$

$$\text{yaw} < \text{yaw\_th} \,\&\&$$

$$\Delta \text{pitch} < \text{pitch\_th} \quad (19)$$

More specifically, the mouth opening/closing determination portion 308 determines the state where the opening/closing movement of the lips is performed when the upper lip and the lower lip move in a direction away from or approaching each other, the variation of the movement of the lips in the horizontal direction of the face is small, and the head portion 101 of the robot 100 does not rotate so much. By the use of not only Δy but also Δx, Δroll, Δyaw, and Δpitch for the opening/closing determination of the lips, erroneous determination can be made hard to occur even in an action of disapproval (shaking the head from side to side) or of inclining the head for thinking.

Returning to the description of FIG. 4, when the control portion 201 determines the state where the opening/closing movement of the lips is performed by the mouth opening/closing determination processing in Step S405, the control portion 201 performs a series of processing in Steps S406 to S408 described below.

First, the control portion 201 determines whether the value of the "open flag" is 0, i.e., the opening/closing movement of the lips has not been performed so far (Step S406).

When the determination in Step S406 is YES, the control portion 201 sets the present time t acquired in Step S404 for start time TS stored as a variable in the RAM which is not particularly illustrated. Moreover, the control portion 201 sets the value of the "open flag" to 1. In FIG. 4, a state where the value of the open flag is 1 is expressed as "Open=1" (Up to this point, Step S407).

Thereafter, the control portion 201 shifts to the following imaging frame processing (Step S408), and then repeats the processing from the processing in Step S402.

On the other hand, when the determination in Step S406 is NO, the control portion 201 shifts to the following imaging frame processing as it is (Step S408), and then repeats the processing from the processing in Step S402.

On the other hand, the mouth opening/closing determination portion 308 of the control portion 201 performs a series of processing in Steps S409 to S412 described below when the state where the opening/closing movement of the lips is not performed is determined by the mouth opening/closing determination processing in Step S405.

First, the control portion 201 determines whether the value of the "open flag" is 1, i.e., the opening/closing movement of the lips has been performed so far (Step S409).

When the determination in Step S409 is NO, the opening/closing movement of the lips has not been performed since before, and therefore the control portion 201 shifts to the following imaging frame processing as it is without performing anything (Step S408), and then repeats the processing from processing in Step S402.

When the determination in Step S409 is YES, i.e., the state is changed from the state where the opening/closing movement of the lips has been performed so far to the state where the opening/closing movement of the lips is not performed, the breathing period determination portion 304 of the control portion 201 performs breathing period determination processing (Step S410). More specifically, the control portion 201 determines whether the elapsed time to the present time t acquired in Step S404 from the start time TS updated in Step S407 is equal to or longer than the predetermined period of time ERT, i.e., "(t−TS)≥ERT" is established. Herein, the predetermined period of time ERT is set to 500 milliseconds, for example, beforehand and is stored in the storage portion 202.

In the breathing period determination processing in Step S410, when the lip movement of the target person is not repeatedly performed until the predetermined period of time ERT elapses after the opening/closing movement of the lips of the target person has been started, a period until the opening/closing movement of the lips of the target person is not performed (the opening/closing movement of the lips of the target person ends) after the opening/closing movement of the lips of the target person has been started is determined as the breathing period immediately before uttering.

When the determination in Step S410 is NO, i.e., when the elapsed time (t−TS) until the opening/closing movement of the lips of the target person is not performed after the opening/closing movement of the lips of the target person has been started is shorter than the predetermined period of time ERT and the lip movement of the target person is not repeatedly performed until the predetermined period of time ERT elapses after the opening/closing movement of the lips of the target person has been started, the breathing period determination portion 304 regards that the target person has taken one breath immediately before uttering, and then determines the period until the opening/closing movement of the lips of the target person is not performed (the opening/closing movement of the lips of the target person ends) after the opening/closing movement of the lips of the target person has been started as the breathing period immediately before uttering. In order not to include the breathing period immediately before uttering in the voice period of the target person detected by the voice period detection portion 301, the process returns to the processing in Step S401, and then the value of the "open flag" is initialized to 0.

On the other hand, when the determination in Step S410 is YES, i.e., when the elapsed time (t−TS) until the opening/closing movement of the lips of the target person is not performed (the opening/closing movement of the lips of the target person ends) after the opening/closing movement of the lips of the target person has been started is equal to or longer than the predetermined period of time ERT and the opening/closing movement of the lips of the target person is repeatedly performed until the predetermined period of time ERT elapses after the opening/closing movement of the lips of the target person has been started, the breathing period determination portion 304 determines that the target person has performed the opening/closing movement of the lips for uttering. When the target person has performed the opening/closing movement of the lips for uttering, the voice period in which the opening/closing movement of these lips is repeatedly performed is longer than the breathing period immediately before uttering (=period of time shorter than the predetermined period of time ERT).

Subsequently, in response to the determination result of Step S410 above, the voice period detection portion 301 of the control portion 201 sets the start time TS (time when the opening/closing movement of the lips has been started) updated in Step S407 above as start timing ST of the voice period (Step S411).

As described above, in this embodiment, when the target person performs the opening/closing movement of the lips only for a moment (only for the period of time shorter than the predetermined period of time ERT) (Step S410: NO), it is regarded that the target person has taken a breath immediately before uttering, and then the value of the "open flag" is initialized to 0 (Step S401). Thus, the start time TS is updated by the execution of the subsequent Steps S405 to S407 and the breathing period immediately before uttering which is a breathing period is not included in the voice period, whereby the voice period can be appropriately detected.

Next, in Step S412 following Step S411 above, the voice period detection portion 301 calculates end timing ET of the voice period of the target person by subtracting the predetermined period of time ERT from the present time t "ET=t−ERT".

Thus, by setting the timing before the predetermined period of time ERT (for example, −500 milliseconds) from the timing when the opening/closing movement of the lips has not been performed as the end timing ET of the voice period, the voice period detection portion 301 can correct a deviation of the timing when the opening/closing movement of the lips has not been performed to the actual end timing of the uttering and improve the accuracy of the end timing ET of the voice period. The predetermined period of time ERT is set beforehand by an experiment or the like so that the end timing ET calculated as described above serves as the actual end timing of the voice period of the target person. Incidentally, although it is also considered that the termination of the uttering is somewhat cut depending on the setting of the predetermined period of time ERT, the termination of a word always ends in a vowel, and therefore, even when the termination of the uttering is somewhat cut, the voice can be correctly recognized, and thus no problems occur.

In Step S413 following Step S412, the voice recognition portion 303 of the control portion 201 performs voice recognition processing of recognizing a voice of the target person based on the voice of the target person acquired and stored by the voice input portion 302 within the voice period specified by the start timing ST and the end timing ET of the voice period set in Steps 411 and 412 above, respectively. Thereafter, the control portion 201 ends the voice period detection processing illustrated by the flow chart of FIG. 4. As described above, in this processing, the detection of the voice period is performed by detecting the start timing ST and the end timing ET.

In the flow chart of FIG. 4, the voice recognition processing is performed after the end of the uttering period has been fixed. However, when the opening/closing movement of the lips is being performed (Step S405), the voice recognition processing may be started when the predetermined period of time ERT has passed from the start time TS. In that case, when the voice recognition is ended when the end timing ET of the voice period is fixed, the end timing of the voice recognition is timing before the predetermined period of time ERT from the timing when the opening/closing movement of the lips has not been performed, and therefore the voice period is the same period as that in the case of the flow chart of FIG. 4.

As described above, this embodiment enables appropriate detection of the voice period.

Specifically, in this embodiment, the voice period of the target person can be appropriately detected without including the breathing period immediately before uttering in the voice period of the target person. Thus, in the case where the target person moves the lips in order to take a breath immediately before uttering, for example, a noise generated during the breathing period immediately before uttering can be removed from the voice recognition target.

Moreover, in this embodiment, when the opening/closing movement of the lips of the target person is not repeatedly performed until the predetermined period of time ERT (first predetermined period of time described in Claims) elapses after the opening/closing movement of the lips of the target person has been started, the period until the opening/closing movement of the lips of the target person is not performed after the opening/closing movement of the lips of the target person has been started is determined as the breathing period immediately before uttering, whereby a period in which the target person moves the lips in order to take a breath immediately before uttering can be certainly detected.

On the other hand, in this embodiment, the voice period is detected with the timing before the predetermined period of time ERT (second predetermined period of time described in Claims) from the timing when the opening/closing movement of the lips of the target person has ended as the end timing of the voice period, whereby, in case that the timing when the uttering actually ends is timing slightly earlier than the timing when the opening/closing movement of the lips ends, the voice period can be appropriately detected in accordance with the case. Thus, a noise generated in the period until the opening/closing movement of the lips ends after the uttering actually ends can be removed from the voice recognition target. In this case, although it is also considered that the termination of the uttering is slightly cut depending on the setting of the above-described period, the termination of a word always ends in a vowel, and therefore, even when the termination of the uttering is slightly cut, the voice can be correctly recognized, and thus no problems occur.

This embodiment enables the achievement of a robot having an advanced interaction function by installing the voice recognition system described above in the robot.

Moreover, in this embodiment, the first and second predetermined periods of time in the present invention are set to the same predetermined period of time ERT but may be set to different predetermined periods of time. Alternatively, the breathing period immediately before uttering determined by the breathing period determination portion 304 in Step S410 of FIG. 4, for example, sometimes varies due to individual differences. Therefore, the predetermined period of time ERT as the first predetermined period of time of the present invention for determining the breathing period immediately before uttering may be set to a value determined for each target person, separately from the second predetermined period of time.

Figure 8:
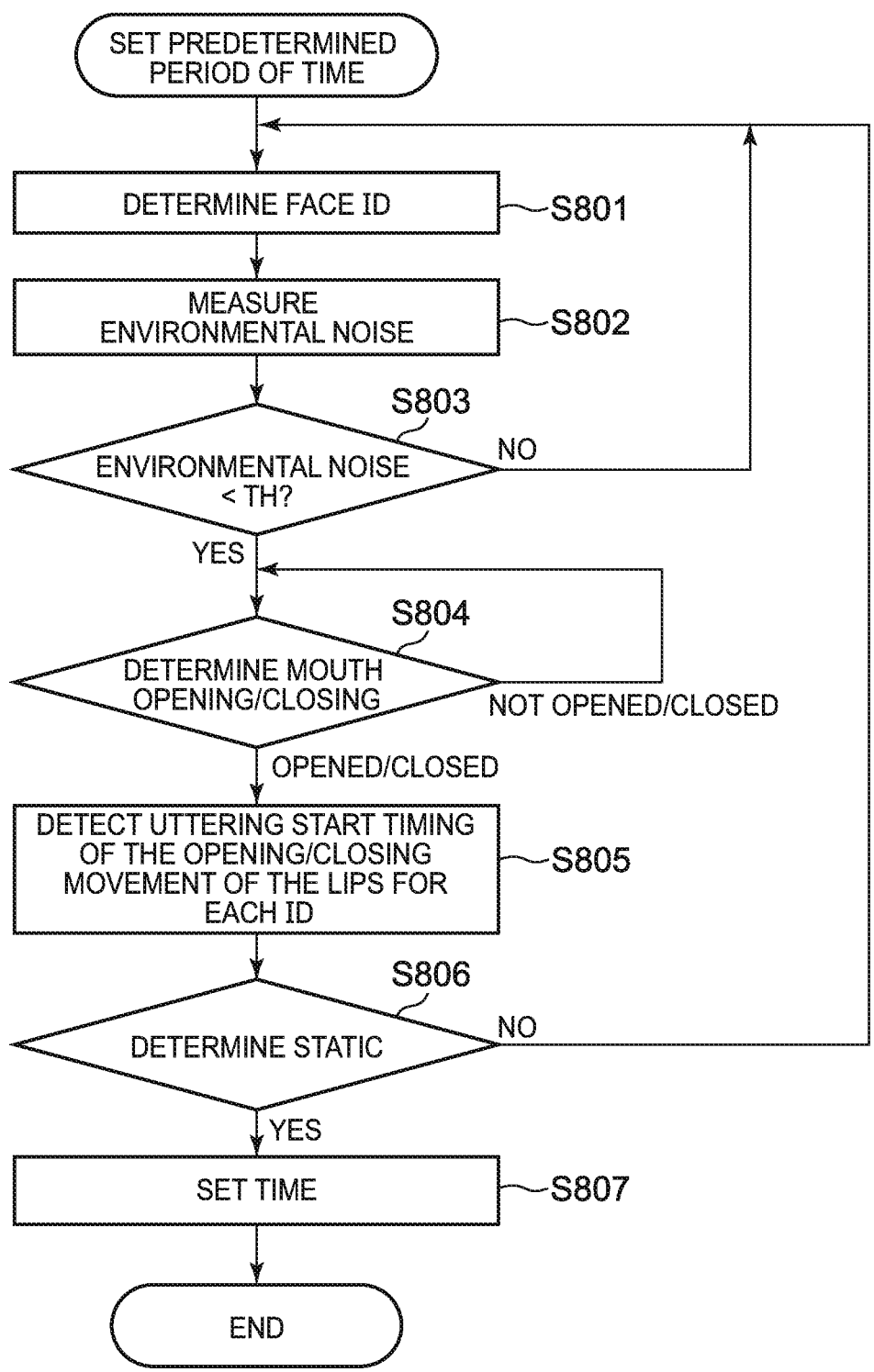
FIG. 8 is a flow chart illustrating an example of setting processing of a first predetermined period of time.

FIG. 8 is a flow chart illustrating an example of setting processing of the predetermined period of time ERT as the first predetermined period of time described above. The processing example of the flow chart is realized as the processing performed by the hardware of the control portion 201 of FIG. 2 or the processing of the control program 205 executed by the control portion 201 of FIG. 2 as with the case of FIG. 4.

First, the control portion 201 performs determination processing of a face ID (Step S801). The control portion 201 performs personal identification processing to a face image detected in the face detection portion 306, and if the face has not been registered yet, the control portion 201 assigns a new ID (identifier) thereto, and newly registers the face. Although there are various methods for the personal identification from the face image and any approach may be used, the technique described in the following document 5, for example, may be applied.

<Document 5>

"Face recognition software "FaceU", [online], Homepage of PUX Corporation [searched on Jun. 12, 2018],Internet <URL: https://www.pux.co.jp/%E8%A3%BD%E5%93%81%E6%83%85%E5%A0%B1/%E7%94%BB%E5%83%8F%E8%AA%8D%E8%AD%98/%E9%A1%94%E8%AA%8D%E8% AD%98/>

Next, the control portion 201 performs environmental noise measurement processing (Step S802). The control portion 201 determines the state where the opening/closing movement of the lips of the target person is not performed by the mouth opening/closing determination portion 308 of FIG. 3, measures the volume during the state by the microphone array 103 of FIG. 1 or FIG. 2, and then determines the measurement result as the noise volume of the environment around the target person. The volume measurement may be performed by all of the microphones of the microphone array 103 or one microphone of the microphone array 103.

Next, the control portion 201 confirms whether the environmental noise volume is smaller than the predetermined threshold (TH), i.e., whether the environment is a sufficient quiet environment, e.g., 30 dB (decibel) (Step S803). This processing secures the correctness of the example of the voice section detection by voice described later. When the determination in Step S803 is NO, the control portion 201 returns to Step S801 without performing anything, and then repeats the processing.

On the other hand, when the determination in Step S803 is YES and the control portion 201 determines that the environmental noise volume is smaller than the predetermined threshold, the mouth opening/closing determination portion 308 (FIG. 3) of the control portion 201 performs the same mouth opening/closing determination processing as that in the case in Step S405 of FIG. 4 (Step S804). This operation is repeatedly performed until it is determined that the mouth opening and closing has been performed (repetition of "No opening/closing movement" in the determination in Step S804). In Step S804, not only the mouth opening/closing determination processing but voice section detection processing described later may be performed.

Next, the control portion 201 performs the statistical processing for each ID (Step S805). In the statistical processing for each ID, the control portion 201 first detects the uttering start timing which is timing that the uttering of the target person has been started based on a voice input into the voice input portion 302 for each ID according to the voice section detection technique example described in Document 6 described later, for example. Next, the control portion 201 detects the start timing of the opening/closing movement of the lips which is timing that the opening/closing movement of the lips of the target person has been started for each ID based on the determination result of the opening/closing movement of the lips by the mouth opening/closing determination portion 308 of the control portion 201. Subsequently, the control portion 201 calculates a difference value between the uttering start timing and the opening/closing movement start timing of the lips which have been detected (Time of uttering start timing−Time of start timing of opening/closing movement of lips, which is referred to as "start timing difference value" below), and then calculates the frequency value of the start timing difference values for each ID.

<Document 6>

LEE Akinobu "Chapter 5 Voice Activity Detection/Input Rejection", [Online], The Julius Book [searched on Jun. 12, 2018], Internet <URL: https://julius.osdn.jp/juliusbook/ja/desc_vad.html>

Furthermore, the control portion 201 performs statistic determination processing (Step S806). In this processing, the control portion 201 determines whether the parameter for the frequency value of the start timing difference values calculated in Step S805 is sufficiently large (compared with a predetermined value).

When the control portion 201 determines that the parameter for the frequency value of the start timing difference values is not sufficiently large (when the determination in Step S806 is No), the control portion 201 returns to Step S801, and then repeats the processing.

When the control portion 201 determines that the parameter for the frequency value has been sufficiently large (when the determination in Step S806 is YES), the control portion 201 performs time setting processing, and then sets the values of the average, the median, the N percentile (N is arbitrary), and the like of the frequency values of the start timing difference values, for example, as the predetermined period of time ERT as the first predetermined period of time described above in the breathing period determination portion 304 of FIG. 3 (Step S807). In Step S806, the number of samples of the frequency values of the start timing difference values may be used in place of the parameter and the determination may be performed on condition that the number of samples is larger than the predetermined number.

By setting the predetermined period of time ERT (first predetermined period of time) for determining the breathing period immediately before uttering according to the uttering start timing and the opening/closing movement start timing of the lips as described above, the voice period can be appropriately detected while appropriately compensating influence of the breathing period immediately before uttering varying due to the difference between target persons. In this case, the values of the average, the median, the N percentile (N is arbitrary), and the like of the frequency values of the start timing difference values are set as the predetermined period of time ERT without using the start timing difference value as it is, and therefore the setting can be appropriately performed in a statistical manner.

The breathing period immediately before uttering is generated due to the peculiarity of the target person, and therefore does not frequently vary. Therefore, the processing illustrated in FIG. 8 is not performed again and the predetermined period of time ERT is not updated for a relatively long period of time after the setting of the predetermined period of time ERT has been performed once, e.g., insofar as the number of times of the uttering of the target person does not reach a relatively large predetermined number of times after the setting of the predetermined period of time ERT has been performed. In addition thereto, the predetermined period of time ERT may be varied by recording the frequency on a graph for each fixed period, and then determining the change in shape (statistic, envelope, and the like) of the frequency graph.

In the processing illustrated in FIG. 8, the predetermined period of time ERT is set based on the difference value between the uttering start timing and the opening/closing movement start timing of the lips. However, the predetermined period of time ERT may be set according to the other suitable parameters (for example, ratio) expressing the relationship between the uttering start timing and the opening/closing movement start timing of the lips or may be set by searching a predetermined map (not illustrated) or using a suitable predetermined calculation expression according to the uttering start timing and the opening/closing movement start timing of the lips.

Furthermore, in this embodiment, when the determination of Step S410 of FIG. 4 is NO, it is regarded that the target person took one breath immediately before uttering and the period until the opening/closing movement of the lips of the target person was not performed after the opening/closing movement of the lips of the target person had been started is determined as the breathing period immediately before uttering. Alternatively, when the determination of Step S410 is NO, the opening/closing movement of the lips of the target parson performed until the determination of Step S409 became YES may be determined as the opening/closing movement with breathing immediately before uttering of the target person. When the determination of Step S410 is YES, the opening/closing movement of the lips of the target person may not be determined as the opening/closing movement with breathing immediately before uttering of the target person. In this case, when the opening/closing movement of the lips of the target person is determined as the opening/closing movement with breathing immediately before uttering of the target person (S410: NO), the start time TS (i.e., timing when the opening/closing movement of the lips of the target person was started) is not set as the start timing ST of the voice period (S401 to S409). When the opening/closing movement of the lips of the target person is not determined as the opening/closing movement with breathing immediately before uttering (S410: YES), the start time TS is set as the start timing ST of the voice period (S411). The method for detecting the voice period using the start timing ST is as described above.

Furthermore, although the start timing ST of the voice period is set not to include the breathing period immediately before uttering in the voice period in this embodiment, the timing when the opening/closing movement of the lips of the target person was started may always be set as the start timing ST of the voice period. Moreover, although the end timing ET of the voice period is set to the timing before the predetermined period of time "ERT" from the timing when the opening/closing movement of the lips of the target person was not performed (the opening/closing movement of the lips of the target person ended) in this embodiment, the end timing ET may be set to the timing when the opening/closing movement of the lips of the target person was not performed (the opening/closing movement of the lips of the target person ended).

When the control portion 201 of FIG. 2 executes the control program 205 stored in the storage portion 202 and illustrated in the processing example of the flow chart of FIG. 4, FIG. 5, or FIG. 8 to thereby realize the function illustrated in FIG. 3 in the embodiments described above, the control program 205 may be distributed while being recorded in an external storage or a portable recording medium, for example, or may be allowed to be acquired from a network through a wireless or wired communication interface which is not particularly illustrated.

What is claimed is:

1. A voice recognition device comprising a processor configured:
    to determine a breathing period immediately before uttering which is a period in which a lip of a target person has moved with breathing immediately before uttering based on a captured image of the lip of the target person;
    to detect a voice period which is a period in which the target person is uttering without including the breathing period immediately before uttering determined above based on the captured image of the lip of the target person captured;
    to acquire a voice of the target person; and
    to recognize the voice of the target person based on the voice of the target person acquired above within the voice period detected above.

2. The voice recognition device according to claim 1, wherein, when an opening/closing movement of the lip of the target person is not repeatedly performed until a first predetermined period of time elapses after the opening/closing movement of the lip of the target person has been started, the processor determines a period until the opening/closing movement of the lip of the target person is not performed after the opening/closing movement of the lips of the target person has been started as the breathing period immediately before uttering based on the captured image of the lip of the target person.

3. The voice recognition device according to claim 2, wherein the processor
    detects opening/closing movement start timing of the lip which is timing when the opening/closing movement of the lip of the target person has been started based on the captured image of the lip of the target person,
    detects uttering start timing which is timing when uttering of the target person has been started based on a voice input from the target person accompanied by the opening/closing movement of the lip of the target person, and
    sets the first predetermined period of time according to the uttering start timing and the opening/closing movement start timing of the lip detected above.

4. The voice recognition device according to claim 3, wherein the processor
    identifies the target person captured above based on the captured image of the target person captured by the camera,
    detects the opening/closing movement start timing of the lip based on the captured image of the lip of the target person identified above,
    detects the uttering start timing based on the voice input from the target person identified above accompanied by the opening/closing movement of the lip of the target person identified above, and
    sets the first predetermined period of time for each target person identified above according to the uttering start timing and the opening/closing movement start timing of the lip detected above.

5. The voice recognition device according to claim 3, wherein the processor
    measures an environmental noise around the target person, and
    detects the opening/closing movement start timing of the lip and the uttering start timing on condition that the environmental noise measured above is smaller than a predetermined threshold.

6. The voice recognition device according to claim 1, wherein the processor detects the voice period with timing before a second predetermined period of time from timing when the opening/closing movement of the lip of the target person has ended as end timing of the voice period based on the captured image of the lip of the target person.

7. A voice recognition device comprising a processor configured:
    to acquire a voice of a target person;
    to detect a voice period in which the target person is uttering with timing before a predetermined period of time from timing when an opening/closing movement of a lip of the target person has ended as end timing of the voice period of the target person based on a captured image of the lip of the target person; and
    to recognize the voice of the target person based on the voice of the target person acquired above within the voice period detected above.

8. A voice recognition device comprising a processor configured:
    to determine whether an opening/closing movement of a lip of a target person is an opening/closing movement with breathing immediately before uttering of the target person based on a captured image of the lip of the target person;
    to detect a voice period which is a period in which the target person is uttering based on the captured image of the lip of the target person, not to set an opening/closing movement start timing which is timing when the opening/closing movement of the lip of the target person has been started as start timing of the voice period when the opening/closing movement of the lip of the target person is determined as the opening/closing movement with breathing immediately before uttering, and to set the opening/closing movement start timing as the start timing of the voice period when the opening/closing movement of the lip of the target person is not determined as the opening/closing movement with breathing immediately before uttering; and
    to recognize a voice of the target person based on the voice of the target person acquired within the voice period detected above.

9. The voice recognition device according to claim 8, wherein, the processor determines whether the opening/closing movement of the lip of the target person is repeatedly performed until a first predetermined period of time elapses after the opening/closing movement of the lip of the target person has been started based on the captured image of the lip of the target person, and then the processor determines that the opening/closing movement of the lip of the target person is not repeatedly performed until the first predetermined period of time elapses after the opening/closing movement of the lip of the target person has been started, the processor determines the opening/closing movement of the lip of the target person as the opening/closing movement with breathing immediately before uttering of the target person.

10. A voice recognition method comprising:
    determining a breathing period immediately before uttering which is a period in which a lip of a target person has moved with breathing immediately before uttering based on a captured image of the lip of the target person;
    detecting a voice period which is a period in which the target person is uttering without including the breathing period immediately before uttering determined above based on the captured image of the lip of the target person captured by the camera;

acquiring a voice of the target person; and recognizing the voice of the target person based on the voice of the target person acquired above within the voice period detected above.

\* \* \* \* \*